United States Patent [19]

Davis

[11] 3,853,623

[45] Dec. 10, 1974

[54] ADDITIVE FOR AN ALKALINE BATTERY EMPLOYING DIVALENT SILVER OXIDE POSITIVE ACTIVE MATERIAL

[75] Inventor: Stuart M. Davis, Madison, Wis.

[73] Assignee: ESB Incorporated, Philadelphia, Pa.

[22] Filed: Aug. 1, 1973

[21] Appl. No.: 384,752

Related U.S. Application Data

[63] Continuation-in-part of Ser. No. 174,526, Aug. 24, 1971, abandoned.

[52] U.S. Cl. .................................. 136/20, 136/107
[51] Int. Cl. ........................................... H01m 35/02
[58] Field of Search ............. 136/20, 107, 153, 154, 136/30

[56] References Cited
UNITED STATES PATENTS

| 3,617,384 | 11/1971 | Kamai | 136/107 X |
| 3,630,779 | 12/1971 | Eisenberg | 136/20 |
| 3,650,832 | 3/1972 | Tvarusko | 136/20 |

Primary Examiner—John H. Mack
Assistant Examiner—C. F. LeFevour

[57] ABSTRACT

An alkaline battery having a divalent silver oxide (AgO) positive active material (cathode) in which gold ions are incorporated into the alkaline electrolyte on the positive side of the battery separator or barrier or added to the positive active material. The gold additive improves the stability of the divalent silver oxide (AgO) active material in the aqueous alkaline electrolyte without adversely affecting the electrochemical reactions during the discharge of the battery. The additive is present in the battery in amounts ranging from about 0.1 to about 10% by weight of silver in the divalent silver oxide positive active material. It is preferred that the divalent silver oxide active material contain at least 50% by weight of divalent silver oxide (AgO) with the balance of the active material comprising monovalent silver oxide ($Ag_2O$) and metallic silver. The gold additive may be combined with other additives and has been found to be particularly effective in some batteries when combined with mercury and incorporated into either the positive active material or the electrolyte on the positive side of the separator.

10 Claims, No Drawings

ADDITIVE FOR AN ALKALINE BATTERY EMPLOYING DIVALENT SILVER OXIDE POSITIVE ACTIVE MATERIAL

CROSS REFERENCE TO RELATED APPLICATIONS

This application is a continuation-in-part directed to an alkaline battery described in application Ser. No. 174,526 filed on Aug. 24, 1971 now abandoned and having the same title as this application. Said parent application was also filed by Stuart M. Davis who hereby claims the benefit of the earlier filing date for all of the subject matter disclosed in said parent application which is also disclosed and/or claimed in this application.

BACKGROUND OF THE INVENTION

In the packaged power industry, there is an ever increasing emphasis upon the development of high capacity, small volume electric cells and batteries. The following is a comparison of some positive active materials currently used in commercially available cells:

| Active Material | EMF vs. Zn in alkaline electrolyte | Capacity ma-hr/g | a-hr/cc |
|---|---|---|---|
| HgO | 1.35v. | 248 | 2.76 |
| $Ag_2O$ | 1.60v. | 232 | 1.67 |
| AgO | 1.82v. | 432 | 3.22 |

The above comparisons clearly indicate that divalent silver oxide (AgO) has the highest capacity per gram or cubic centimeter and also the highest EMF. With the advancement of semi-conductor technology and the increasing use of semi-conductors in electronic devices, there is greater than ever need for high capacity, small volume packaged power sources having high voltages.

As shown by the preceding table, divalent silver oxide is an excellent high capacity positive active material having a relatively high EMF, but unfortunately, it has limited use as a battery active material because of its lack of stability when in contact with aqueous alkaline solutions. It is well-known that divalent silver oxide evolves oxygen when in contact with aqueous alkaline solutions as represented by the following reaction:

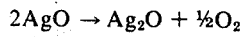

$$2AgO \rightarrow Ag_2O + \tfrac{1}{2}O_2$$

As a result of this instability, alkaline batteries employing a divalent silver oxide positive material suffer a loss of capacity on activated stand because of the conversion of the divalent silver oxide to monovalent silver oxide. In addition, the gassing of the divalent silver oxide precludes its use in sealed cells and batteries because of the hazard of pressure build-up and possible explosion of the sealed cell. The formation of gas bubbles within the sealed cell also increases the impedance of the cell.

The properties of divalent silver oxide active material have been studied by many persons skilled in the battery art, and there are two articles relating to additives for silver oxide which have been published and which are particularly pertinent to this invention. "Electrode Phenomena of Silver-Silver Oxide System in Alkaline Batteries" by Shiro Yoshizawa and Zenichiro Takehara published in the Journal of the Electrochemical Society of Japan, Volume 32, Number 3, pages 91–104 (1963) reports the effect of various metallic additives on the oxidation of silver electrodes. Among the additives studied by the Japanese was gold which was reported to increase the rate of formation of divalent silver oxide during the electrochemical formation of silver electrodes, i.e. oxidation of silver. Another article entitled "The Electric Resistivity of Silver Oxide" by Aladar Tvarusko published in the Journal of the Electrochemical Society, Volume 115, Number 11, pages 1105–1110 (November, 1968) reported on various metallic additives and their effect on the electric resistivity of divalent silver oxide. The article reports that mercury decreased the electric resistivity of silver oxide.

The patent literature also contains publications disclosing additives for alkaline batteries employing silver positive electrodes. U.S. Pat. No. 3,617,384 issued to Kamai et al. on Nov. 2, 1971 discloses a secondary zinc alkaline cell in which gold or silver, alloys thereof, oxides and hydroxides may be added to the zinc anode. U.S. Pat. No. 3,650,832 issued to Aladar Tvarusko on Mar. 21, 1972 discloses additives for divalent silver oxide selected from mercury, selenium, tellurium and combinations of mercury with tin or lead. Japanese Patent Application No. 48–1929 which was open to public inspection on Jan. 22, 1973 discloses adding gold hydroxide into the electrolyte of an alkaline silver oxide cell.

SUMMARY OF THE INVENTION

It is the general object of this invention to provide an improved alkaline battery employing divalent silver oxide (AgO) positive active material and containing an ionic gold additive in either the alkaline electrolyte on the positive side of the battery separator or barrier or the positive active material. The additive may consist essentially of gold ions and mercury ions which are particularly effective as stabilizers for divalent silver oxide active material when used in combination. It is preferred that the divalent silver oxide active material comprise at least 50% by weight of divalent silver oxide so as to improve the electrical conductivity of the active material and to provide a battery active material having a higher capacity. Other objects and advantages of this invention may be determined from the description which follows.

It has been discovered that an ionic gold additive incorporated in either the alkaline electrolyte on the positive side of the battery separator or the divalent silver oxide active material substantially improves the stability of the divalent silver oxide active material in aqueous alkaline electrolyte without adversely affecting the electrochemical reactions during the discharge of the battery. It is generally preferred to incorporate the gold additive in amounts ranging from about 0.1 to about 10% by weight of silver present in the divalent silver oxide active material. In addition, the additive may comprise a combination of gold ions and mercury ions with the major amount (by weight) of the additive being gold. The gold additive may be physically admixed into the divalent silver oxide active material, though it is generally preferred to incorporate a soluble gold compound into the alkaline electrolyte used to prewet the divalent silver oxide active material.

DETAILED DESCRIPTION

It has been discovered that alkaline cells employing divalent silver oxide positive active material and an ionic gold additive in the alkaline electrolyte solely on the positive side of the battery separator or barrier provide superior performance in terms of lower impedance, higher flash amperage and total capacity as compared to identical cells without such additive in the alkaline electrolyte. It has been found that combinations of gold and mercury additives may be particularly effective in improving the stability of divalent silver oxide active material in aqueous alkaline electrolyte.

The gold additive may be incorporated into either the divalent silver oxide positive active material or the alkaline electrolyte. If desired, the additive can be incorporated into both the positive active material and the alkaline electrolyte. The gold additive may be incorporated into the battery by dissolving it in the alkaline electrolyte or it may be incorporated as a solid into the positive active material which will dissolve in the alkaline electrolyte in situ. It is generally preferred to incorporate the gold, and mercury if used, in the oxide form, but compounds of gold and mercury other than oxides may be employed so long as the compounds are soluble in the alkaline electrolyte and the anion does not adversely affect the electrochemical reaction during the discharge of the battery.

It has been found that special procedures are required to make the gold additive effective for suppressing the gassing of divalent silver oxide in alkaline electrolyte. Electrolytes containing gold oxide ($Au_2O_3$) require prolonged boiling or very long room temperature aging when first prepared in order to provide increased stability for the divalent silver oxide active material. If the electrolyte is not boiled or aged for a substantial period of time, the addition of the gold oxide to the alkaline electrolyte may even accelerate the gassing of divalent silver oxide active material in the electrolyte rather than suppressing it.

It has also been discovered that the gold additive adversely affects the zinc negative electrode. Because of this adverse effect on the zinc electrode, when the gold additive is incorporated into the electrolyte, the electrolyte containing the gold must be added only to the divalent silver oxide positive active material, and a semi-permeable separator material which prevents the migration of the gold ions should be used to separate the positive active material from the zinc negative electrode.

Since an object of this invention is to provide a divalent silver oxide active material having improved capacity and electrical conductivity, it is important that the active material contain at least 50% by weight of divalent silver oxide (AgO) with the balance of the active material comprising monovalent silver oxide ($Ag_2O$) and metallic silver. The monovalent silver oxide has a relatively high electrical resistance, and therefore, it is important to keep the monovalent silver oxide content to a minimum. In addition, the monovalent silver oxide has much less capacity per unit weight than divalent silver oxide, and therefore, the divalent silver oxide is preferred. It is particularly preferred that at least about 90% of the positive active material be divalent silver oxide.

In order to provide an improved alkaline cell employing divalent silver oxide positive active material in accordance with this invention, it is preferred that the gold additive be incorporated into the battery in amounts ranging from about 0.1 to about 10% by weight of silver present in the positive active material.

If both gold and mercury are added, the total of both the gold and mercury should preferably fall within this range of about 0.1 to about 10%, and it is generally preferred that the gold comprise at least 50% by weight of the combined additives. Though the additive is generally effective when present in these amounts, it may adversely affect the discharge of the battery when present in larger amounts, and when incorporated in the positive active material, the increased amount of the additive decreases the amount of the positive active material.

The following examples illustrate the improved stability of divalent silver oxide positive active material in aqueous alkaline electrolyte.

EXAMPLE I

Alkaline electrolyte containing the two component additives in accordance with this invention was prepared by boiling 0.2 grams gold sequioxide ($Au_2O_3$) in a glass flask containing 100 ml of 45% by weight potassium hydroxide solution for exactly fifteen minutes. Then 0.05 grams mercury oxide (HgO) were added to the solution containing the gold oxide which had previously been boiled, and the solution containing both the gold an mercury oxides was re-boiled for ten minutes. Then the alkaline solution was cooled and the volume was adjusted with distilled water to compensate for the evaporated water.

0.5 gram portions of divalent silver oxide (AgO) active material containing 96.1% by weight of divalent silver oxide were inserted in several samples of the electrolyte and the gassing rate of the divalent silver oxide active material was determined over a 24 hour period. The following test results were obtained:

| Electrolyte | Gassing Rate (ml/g/AgO/day) |
|---|---|
| 1. 45% KOH | 0.316 |
| 2. 45% KOH saturated with HgO | 0.212 |
| 3. 45% KOH saturated with HgO + 2mg/ml | 0.011 |
| 4. 45% KOH + 2mg/ml $Au_2O_3$ | 0.027 |

These results clearly demonstrate the improvement in the stability of divalent silver oxide active material in alkaline electrolyte provided by the gold additive. It should be noted that the combination of the gold and mercury additives was better than either the gold or mercury used alone, and in electrolyte No. 3 the gassing was virtually eliminated.

EXAMPLE II

Pellets prepared from 0.25g of divalent silver oxide (AgO) active material containing 95.7% by weight of AgO were placed in 45% by weight potassium hydroxide aqueous electrolyte solution saturated with mercuric oxide (HgO). One pellet was placed in electrolyte containing 2 milligrams per milliliter of gold oxide ($Au_2O_3$) and the other pellet was placed in electrolyte without the gold additive. The AgO pellet in the electrolyte without gold and a gassing rate of 0.070 milliliters of gas per gram of AgO per day, whereas the pellet in the electrolyte containing gold had a gassing rate of only 0.003 ml/g AgO/day.

EXAMPLE III

Divalent silver oxide/zinc button cells were constructed and tested for impedance and flash amperage after storage at 113°F. The cells were made from the following components:

Zinc Anode: 0.20 - 0.21 g. of 14% amalgamated, granulated zinc.

Silver Oxide Cathode: AgO containing 1% by weight of polytetrafluoroethylene (Teflon).

Cathode Electrolyte: The cathodes in some cells were prewet with 2.8 ml/100g. of solids of 45% by weight KOH aqueous solution saturated with HgO. In some cells, this electrolyte contained 6 mg. of $Au_2O_3$ per ml. of solution.

Cathode Pellet: 0.472 – 0.482g. of AgO + Teflon mix was compressed at 3,000 lbs. in a die having a 0.410 inch diameter.

Separator: Absorbent layer was a cellulosic material (Webril No. 2401) treated with a wetting agent (Triton X-100). The barrier layer was a 95% crosslinked polymethacrylic acid having a 0.420 inch diameter.

Electrolyte: 0.145 – 0.155 g of 45% by weight KOH aqueous solution containing 7% by weight of ZnO.

The impedance of the cells were measured using a calibrated 1000 cycle a.c. current source and a voltmeter. The flash amperage was measured by dead shorting an ammeter across the cells. The following results were obtained:

| Cell Age | Impedance (ohms) | | Flash Amperage (amps) | |
|---|---|---|---|---|
| | Gold | No Gold | Gold | No Gold |
| Initial | 4.5 | 4.5 | 0.43 | 0.46 |
| 4 weeks at 113°F | 9.0 | 29.0 | 0.23 | 0.04 |
| 6 weeks at 113°F | 15.0 | 27.0 | 0.17 | 0.16 |

These results illustrate the beneficial effects provided by the gold additive on impedance and flash amperage after storage of button cells at elevated temperature.

EXAMPLE IV

Divalent silver oxide (AgO) - zinc button cells were constructed similar to the cells in Example III which were tested to determine the effect, if any, of the gold additive on capacity. The gold additive was gold oxide ($Au_2O_3$) dissolved in 45% KOH aqueous electrolyte solution in both low level (0.5 mg/ml of $Au_2O_3$) and high level (2 mg/ml of $Au_2O_3$) proportions. The electrolyte in the test cells was saturated with mercuric oxide (HgO), but the control cell contained no gold or mercury additive. In one group of test cells, the electrolyte containing $Au_2O_3$/HgO was present in both the divalent silver oxide (AgO) cathode material and in the absorbent layer of the separator which was adjacent to the zinc anode. In another group of cells, the electrolyte containing $Au_2O_3$/HgO was added only to the cathode active material.

The cells were stored for 4 weeks at 113°F/50% relative humidity prior to testing. The capacity was determined by discharging the cells through a 625 ohm load for a period of 16 hours per day. The total hours discharge to a 0.9 volt cut-off point for a 3 cell average yielded the following results:

| Control | Low Level $Au_2O_3$ + HgO in cathode and Absorbent | Low Level $Au_2O_3$ + HgO in cathode | High Level $Au_2O_3$ + HgO in cathode and Absorbent | High Level $Au_2O_3$ + HgO in cathode |
|---|---|---|---|---|
| 18.5 hrs. | 41.3 hrs. | 53.9 hrs. | 26.4 hrs. | 57.2 hrs. |

These results clearly demonstrate the beneficial effects of the $Au_2O_3$/HgO additive combination with respect to improved capacity after storage at elevated temperatures. In addition, it also indicates that the presence of the additive in the absorbent layer in contact with the zinc anode caused a detrimental effect upon cell capacity.

EXAMPLE V

Watch battery cells of the RW–32 size employing divalent silver oxide (AgO) positive active material, zinc negative active material, a barrier separator comprising a laminate of cellophane between polyethylene grafted with polyvinyl chloride (Permion), and potassium hydroxide electrolyte were tested for shelf stability at elevated temperature. The variable was the addition of gold hydroxide to the positive active material and the negative active material. The stability was determined by measuring the cell expansion (bulging) after storage at 165°F for 3 days. The following results were recorded:

| | Cell Expansion (inches) |
|---|---|
| Control — No gold additive | 0.0275 |
| 0.3% by wt. Au in Positive | 0.0045 |
| 0.3% by wt. Au in Positive & Negative | 0.0035 |
| 0.3% by wt. Au in Positive & 3.0% in Negative | 0.025 |

These results indicate that the presence of 3.0% Au in the negative active material did have a detrimental effect on the cell stability.

EXAMPLE VI

As a result of the disclosure by the Japanese (Yoshizawa and Takehara), positive active material was prepared from both pure silver powder and silver powder containing 2% gold. It was found that divalent silver oxide was more readily formed by anodic oxidation in KOH solution of the silver containing the gold additive, confirming the teaching of the Japanese. Oxidation of the pure silver powder yielded 29.86% AgO whereas the silver powder containing the gold yielded 42.01% AgO.

Both of these silver oxide materials were tested for their stability in an excess volume of alkaline electrolyte solution at 165°F. The following results were recorded:

| Material | 45% KOH + 7% ZnO | 18% NaOH + 1.25% ZnO |
|---|---|---|
| $Ag_2O$/AgO (29.86% AgO) | 867 µl/hr/g | 98 µl/hr/g |
| $Ag_2O$/AgO + 2% Au (42.01% AgO) | 156 µl/hr/g | 12.5 µl/hr/g |

These results indicate that the addition of gold to silver powder to increase the formation of divalent silver oxide as disclosed by the Japanese apparently increases the stability of the silver oxide in alkaline electrolyte. The Japanese do not disclose such an improvement in stability and they do not disclose the addition of gold to silver oxide active material which has already been oxidized nor any reason for adding gold thereto.

EXAMPLE VII

Watch battery cells of the RW32 size were prepared in which gold compounds were dry blended with divalent silver oxide (AgO) positive active material having an average gassing rate of more than 150 ul/g./hr. in 18% NaOH solution at 165°F. Gold oxide ($Au_2O_3$) or gold chloride ($AuHCl_4 \cdot 3H_2O$) were dry blended with AgO powder (98.5g.) polytetrafluoroethylene powder (1.5g.) and silica powder (3.0g.). The cells had zinc powder anodes, an absorbent separator (Webril) and a semi-permeable barrier of cellophane between polyethylene grafted with polyvinyl chloride and an 18% by weight NaOH electrolyte solution (total electrolyte weight of about 0.139g.) containing 1.25% by weight of ZnO. The following data was recorded:

| AgO Positive Material | Cell Bulging (mils) 1 day at 165°F | Cell Bulging (mils) 12 wks. at 130°F-50% RH | Capacity (MAH/cell) | Shelf life 12 wks. at 130°F-50% RH |
|---|---|---|---|---|
| Control (no Au) | 8.5 | 23.5 | 245 | 4/6 |
| 0.2% $Au_2O_3$ | 8.0 | 14.5 | 240 | 4/6 |
| 0.4% $Au_2O_3$ | 7.5 | 11.5 | 253 | 2/6 |
| 0.6% $Au_2O_3$ | 6.5 | 10.5 | 262 | 2/6 |
| 2.0% $Au_2O_3$ | 8.5 | 24.0 | 218 | 4/6 |
| 0.1% $AuHCl_4$ | 6.5 | 11.5 | 242 | 5/6 |
| 0.2% $AuHCl_4$ | 6.5 | 13.0 | 250 | 5/6 |
| 0.3% $AuHCl_4$ | 3.0 | 10.0 | 241 | 6/6 |

The cell capacity data was obtained by continuously discharging the cells at 6500 ohm load. The shelf life data represents the number of dead cells (denominator). The cells containing 0.6% $Au_2O_3$ appeared to have the best shelf life, capacity and bulging properties.

EXAMPLE VIII

The effect of gold hydroxide ($Au(OH)_3$) on the stability of divalent silver oxide in alkaline electrolyte was also tested. The cells were made as in Example VII with the only difference being that $Au(OH)_3$ was the source of the gold ion and the divalent silver oxide was from a different batch having an average gassing rate of more than 200 ul/g./hr. in NaOH. The following results were recorded:

| Property | Control (No Au) | Invention (0.3% $Au(OH)_3$) |
|---|---|---|
| Expansion (mils) 3 days at 165°F | 26 | 7 |
| do. 4 wks. at 113°F—50% RH | 19 | 1 |
| do. 8 wks. do. | 22 | 3 |
| Initial Cell Capacity (6500 ohm) | 244 | 260 |

The substantial improvement in stability provided by the $Au(OH)_3$ is apparent.

Having completely described this invention, what is claimed is:

1. An alkaline battery having a negative electrode, an alkaline electrolyte, a divalent silver oxide positive electrode having a divalent silver oxide (AgO) content of at least 50% by weight, and a semi-permeable barrier separator between said negative and positive electrodes, the improvement comprising said alkaline electrolyte containing gold ions in the amount ranging from about 0.1 to about 10% by weight of silver in the positive electrode active material, said gold ions being present in the electrolyte only on the positive electrode side of said barrier separator, whereby the stability of the divalent silver oxide material in alkaline electrolyte is improved so as to yield less than about 65 microliters of gas per gram per hour when measured at 165°F. in a battery having an electrolyte of 18% by weight of sodium hydroxide.

2. A battery in accordance with claim 1 in which the divalent silver oxide active material also contains a gold compound therein, with the total amount of the gold in both the electrolyte and the active material ranging from about 0.1 to about 10% by weight of silver in the positive active material.

3. A battery in accordance with claim 1 in which the electrolyte also contains mercury ions on the positive electrode side of the barrier separator, with the total amount of the gold and mercury in the electrolyte on the positive side of the barrier ranging from about 0.1 to about 10% by weight of silver in the positive active material and said gold ions comprise at least about 50% by weight of the total mercury and gold content.

4. A battery in accordance with claim 2 in which the electrolyte also contains mercury ions on the positive electrode side of the barrier separator, with the total amount of the gold and mercury on the positive side of the barrier ranging from about 0.1 to about 10% by weight of silver in the positive active material and said gold comprises at least 50% by weight of the total mercury and gold content.

5. A battery in accordance with claim 4 in which the divalent silver oxide active material also contains a mercury compound.

6. An alkaline battery having a negative electrode, an alkaline electrolyte, a divalent silver oxide positive electrode having a divalent silver oxide (AgO) content of at least 50% by weight, and a semi-permeable barrier separator between said negative and positive electrodes, the improvement comprising incorporating a gold compound in the divalent silver oxide active material after the formation of the divalent silver oxide, with the gold being present in the amount ranging from about 0.1 to about 10% by weight of silver in the positive electrode active material, whereby the stability of the divalent silver oxide material in alkaline electrolyte is improved so as to yield less than about 65 microliters of gas per gram per hour when measured at 165°F. in a battery having an electrolyte of 18% by weight of sodium hydroxide.

7. A battery in accordance with claim 6 in which the divalent silver oxide active material also contains a mercury compound, with the total amount of the gold and mercury ranging from about 0.1 to about 10% by weight of silver in the positive active material and the gold comprises at least about 50% by weight of the total gold and mercury content.

8. An alkaline battery specifically designed as a power source for an electric watch which comprises a zinc negative electrode, a sodium hydroxide electrolyte, a divalent silver oxide positive electrode having a divalent silver oxide (AgO) content of at least 90% by weight, a semi-permeable barrier separator between said negative and positive electrodes and an absorbent separator material in contact with the zinc negative electrode, said sodium hydroxide electrolyte containing gold ions only on the positive electrode side of said barrier separator, with said gold ions being present in an amount ranging from about 0.1 to about 2% by weight of silver in the divalent silver oxide active material, whereby the stability of the divalent silver oxide material in sodium hydroxide solution is improved so as to yield less than 25 microliters of gas per gram per hour when measured at 165°F in a battery having an electrolyte of 18% by weight of sodium hydroxide.

9. A battery in accordance with claim 8 in which the sodium hydroxide electrolyte concentration is about 18% by weight.

10. A battery in accordance with claim 8 in which the barrier separator comprises a laminate of cellophane between polyethylene grafted with polyvinyl chloride.

* * * * *